(12) United States Patent
Huang et al.

(10) Patent No.: US 9,297,959 B2
(45) Date of Patent: Mar. 29, 2016

(54) OPTICAL ARTICLES AND METHODS OF MAKING SAME

(75) Inventors: Xiaoyue Huang, Eden Prairie, MN (US); Lijuan Zou, Eden Prairie, MN (US); Yongjun Zhao, Eden Prairie, MN (US); Michael Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 1217 days.

(21) Appl. No.: 13/248,687

(22) Filed: Sep. 29, 2011

(65) Prior Publication Data

US 2013/0084441 A1 Apr. 4, 2013

(51) Int. Cl.
*G02B 6/136* (2006.01)
*G02B 6/138* (2006.01)
*G11B 5/31* (2006.01)
*G11B 5/00* (2006.01)

(52) U.S. Cl.
CPC ............... *G02B 6/136* (2013.01); *G02B 6/138* (2013.01); *G11B 5/3163* (2013.01); *G11B 2005/0021* (2013.01); *Y10T 428/24942* (2015.01)

(58) Field of Classification Search
CPC ...... B82Y 20/00; G02B 6/122; G02B 6/1223; G02B 6/132; G11B 5/02; G11B 5/1278; G11B 5/4866; G11B 5/314
See application file for complete search history.

(56) References Cited

U.S. PATENT DOCUMENTS

| | | | |
|---|---|---|---|
| 6,211,090 B1 * | 4/2001 | Durlam et al. | 438/692 |
| 6,306,313 B1 * | 10/2001 | Fetter et al. | 216/67 |
| 6,861,327 B2 | 3/2005 | Seo | |
| 8,009,711 B2 | 8/2011 | Behfar | |

* cited by examiner

*Primary Examiner* — Duy Deo
(74) *Attorney, Agent, or Firm* — Mueting, Raasch & Gebhardt, P.A.

(57) ABSTRACT

Disclosed herein is a method for fabricating an optical device that includes depositing an etch stop material to form an etch stop layer, wherein the etch stop material has a refractive index in the infrared wavelength range, $n_1$; depositing a core material to form a core layer, wherein the core material has a refractive index in the infrared wavelength range, $n_2$; and etching the core layer using a halide based etch process, wherein the etch stop material has an etch rate in the halide based etch process and the core material has an etch rate in the halide based etch process, wherein the etch rate of the core material is at least about five times higher than the etch rate of the etch stop material, and wherein $n_1$ is not greater than $n_2$.

18 Claims, 6 Drawing Sheets

OPTICAL ARTICLES AND METHODS OF MAKING SAME

BACKGROUND

"Heat assisted magnetic recording," optical assisted recording or thermal assisted recording (collectively hereinafter HAMR), generally refers to the concept of locally heating a recording medium to reduce the coercivity of the recording medium so that an applied magnetic writing field can more easily affect magnetization of the recording medium during a temporary magnetic softening of the recording medium caused by the local heating. HAMR allows for the use of small grain media, which is desirable for recording at increased areal densities, with a larger magnetic anisotropy at room temperature assuring a sufficient thermal stability. HAMR can be applied to any type of storage media, including for example, tilted media, longitudinal media, perpendicular media, and/or patterned media.

HAMR heads utilize various optical articles in order to direct and concentrate energy for heating the recording medium. These optical articles often include features, such as gaps, trenches and gratings that are formed within the waveguide of HAMR heads. Typical etching processes could benefit from changes that afford stricter control of feature size.

SUMMARY

Disclosed herein is a method for fabricating an optical device that includes depositing an etch stop material to form an etch stop layer, wherein the etch stop material has a refractive index in the infrared wavelength range, $n_1$; depositing a core material to form a core layer, wherein the core material has a refractive index in the infrared wavelength range, $n_2$; and etching the core layer using a halide based etch process, wherein the etch stop material has an etch rate in the halide based etch process and the core material has an etch rate in the halide based etch process, wherein the etch rate of the core material is at least about five times higher than the etch rate of the etch stop material, and wherein $n_1$ is not greater than $n_2$.

Also disclosed is a method for fabricating an optical device including depositing a cladding layer on a substrate; depositing an etch stop material on the cladding layer to form an etch stop layer, wherein the etch stop material includes yttrium oxide ($Y_2O_3$); depositing a core material on the etch stop layer to form a core layer; and etching the core layer using a halide based etch process, wherein the etch stop material has an etch rate in the halide based etch process and the core material has an etch rate in the halide based etch process, and wherein the etch rate of the core material is at least about five times higher than the etch rate of the etch stop material.

Also disclosed is an optical article that includes an etch stop layer, the etch stop layer including an etch stop material that has an index of refraction, $n_1$; an etched core layer, the core layer including a core material that has an index of refraction, $n_2$; a bottom cladding layer, and at least one active region, wherein $n_2$ is greater than $n_1$, the etch stop layer is between the etched core layer and the bottom cladding layer, and wherein the at least one active region was formed by etching the core layer using the etch stop layer as an etch stop, and filling the etched portions of the etched core layer.

Also disclosed is an optical article that includes an etch stop layer, the etch stop layer including an etch stop material that has an index of refraction, $n_1$; a core layer, the core layer including a core material that has an index of refraction, $n_2$; a bottom cladding layer, the bottom cladding layer including a cladding material that has an index of refraction, $n_3$; and at least one active region, wherein $n_1$ is within 15% of $n_2$, the etch stop layer is surrounded by the core layer and the core layer is positioned adjacent the bottom cladding layer, and wherein the at least one active region was formed by etching a portion of the core layer using the etch stop layer as an etch stop, and filling in the etched portion of the etched core layer.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed herein are methods of fabricating or forming optical devices. One such exemplary method includes the steps of depositing an etch stop material on a structure to form an etch stop layer; depositing a core material on a structure to form a core layer; and etching the core layer using a halide based etch process. In embodiments, the etch stop material can be deposited before the core material is deposited; and in embodiments, the etch stop material can be deposited after the core material is deposited. In embodiments, the etch stop material can be deposited after the core material is deposited and then additional core material can be deposited.

Figure 1:
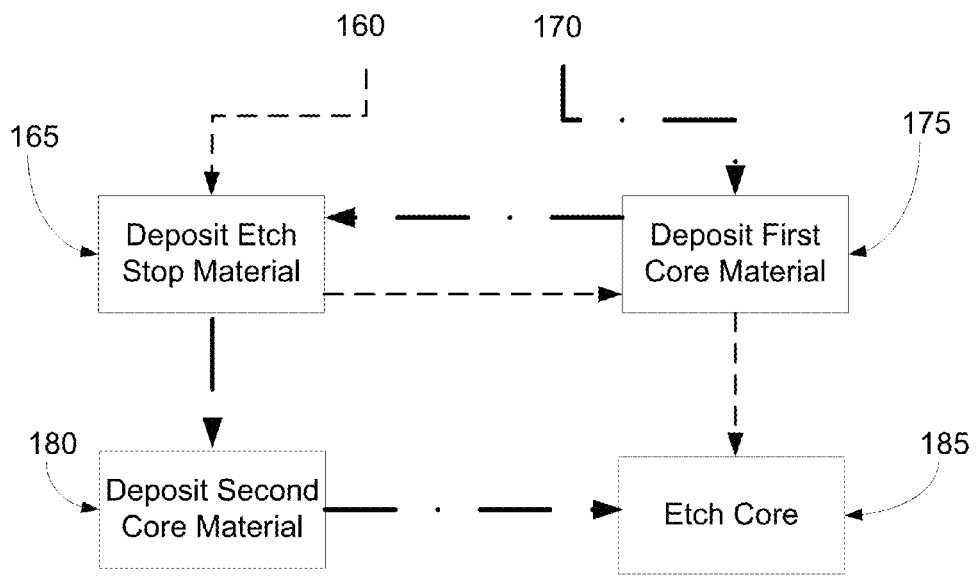
FIG. 1 illustrates exemplary methods disclosed herein.

FIG. 1 illustrates two exemplary methods disclosed herein. In the first method, shown in the flowchart of FIG. 1 as method 160, the first step, step 165, is to deposit etch stop material. The etch stop material can be deposited on any structure, for example a substrate or a substrate with other structures or layers formed thereon. Deposition of the etch stop material forms an etch stop layer. The next step, shown by the constant dashed line, is step 175, to deposit core material. In this exemplary method, the core material can be deposited on a portion of the etch stop layer, on most of the etch stop layer, substantially all of the etch stop layer, or on all the etch stop layer. Deposition of the core material forms the core layer. The next step in this exemplary method is step 185, to etch the core layer. Etching of the core layer forms an etched core layer.

The second method shown in FIG. 1 is method 170. The first step in method 170 is step 175, to deposit a first core material. The core material can be deposited on any structure, for example a substrate or a substrate with other structures or layers formed thereon. Deposition of the first core material forms a first core layer. The next step, shown by the variable dashed line, is step 165, to deposit etch stop material. In this exemplary method, the etch stop material can be deposited on a portion of the first core layer, on most of the first core layer, substantially all of the first core layer, or on all the first core layer. Deposition of the etch stop material forms the etch stop layer. The next step in this method is step 180, to deposit a second core material. The first core material can be the same or different than the second core material. The core material deposited in this step can be deposited on most of the etch stop layer, substantially all of the etch stop layer, or on all the etch stop layer. The second deposition of core material can effectively sandwich the etch stop layer between two core layers. The next step in this method is step 185, to etch the second core material. Etching of the second core layer forms an etched core layer.

Methods that include other steps not specifically discussed herein can also be included in disclosed methods. Exemplary optional steps can include, for example, chemical mechanical polishing (CMP), ashing and photolithograpy.

Figure 2A:
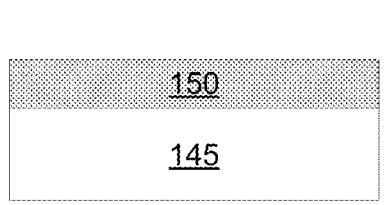
FIGS. 2A-2C show an article at various stages of a disclosed method to form an optical device.
Figure 2B:
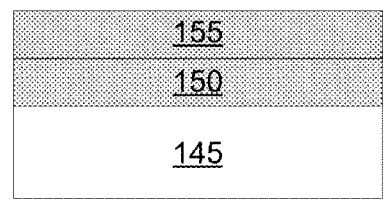
Figure 2C:
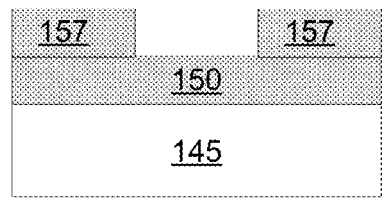

FIGS. 2A through 2C show an article that can result from the method 160 shown in FIG. 1. FIG. 2A shows the article after step 165, deposition of the etch stop material, has been completed. The article includes the substrate 145 and the etch stop layer 150 formed thereon. FIG. 2B shows the article after step 175, deposition of the core material, has been completed. The article further includes the core layer 155 formed on the etch stop layer 150. FIG. 2C shows the article after step 185, etching the core layer, has been completed. The article further includes the etched core layer 157 on the etch stop layer 150.

Figure 3A:
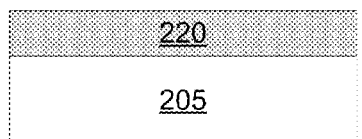
FIGS. 3A-3D show an article at various stages of a disclosed method to form an optical device.
Figure 3B:
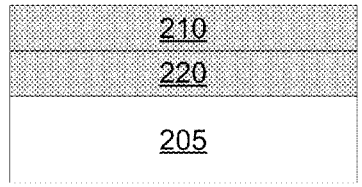
Figure 3C:
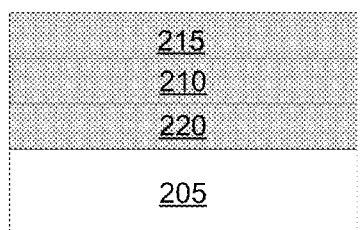
Figure 3D:
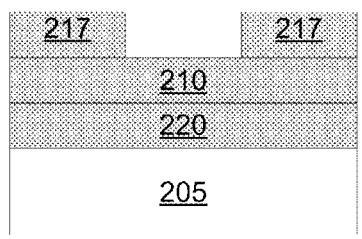

FIGS. 3A through 3D show another exemplary article that can result from the method 160, shown in FIG. 1. This article begins with a substrate 205 upon which a bottom cladding layer 220 has been formed. Step 165, deposition of the etch stop material, deposits the etch stop material on the bottom cladding layer 220 to form the etch stop layer 210, as seen in FIG. 3B. FIG. 3C shows the article after step 175, deposition of the core material to form the core layer 215. FIG. 3D shows the article after step 185, etching the core layer, to form the etched core layer 217.

Figure 4A:
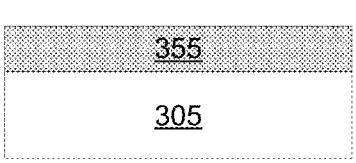
FIG. 4A-4D show an article at various stages of a disclosed method to form an optical device.
Figure 4B:
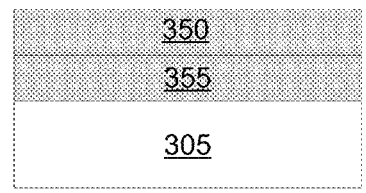
Figure 4C:
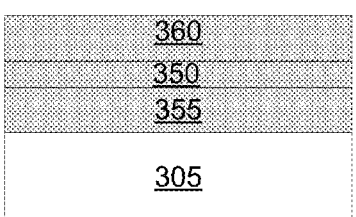
Figure 4D:
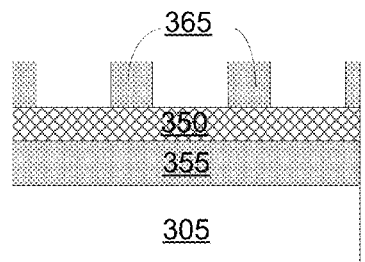

FIGS. 4A through 4D show an article that can result from the method 170 shown in FIG. 1. FIG. 4A shows the article after step 175, deposition of the first core material, has been completed to form a core layer 355 on a substrate 305. FIG. 4B shows the article after step 165, deposition of the etch stop material, has been completed to form an etch stop layer 350 on the core layer 355. FIG. 4C shows the article after step 180, deposition of the second core material, has been completed to form a second core layer 360 on the etch stop layer 350. FIG. 4D shows the article after step 185, etching the second core layer, to form an etched core layer 365.

Deposition of the various materials, for example the etch stop material, the core material, and the cladding material, can be accomplished using commonly utilized techniques. Exemplary techniques can include, for example, vacuum deposition techniques such as radio-frequency (RF) sputtering, reactive sputtering, and atomic layer deposition (ALD); chemical vapor deposition (CVD); or plasma enhanced chemical vapor deposition (PECVD).

With respect to deposition of an exemplary etch stop material, $Y_2O_3$, the following can be considered generally useful deposition parameters. A magnetron design having a rotary apple shape alignment; a magnetron field >500 Gauss; a target having a diameter of >12 inches in diameter; power <2000 W; a base pressure <$1 \times 10^{-7}$ Torr; a process pressure <5 mTorr; Argon (Ar) flow <90 sccm; a bias voltage of <100 W; and a target to substrate distance of 1 to 2 inches. In an embodiment, the following deposition parameters can be utilized to deposit $Y_2O_3$. A magnetron design having a rotary apple shape alignment; a magnetron field >500 Gauss; a target having a diameter of about 13 inches in diameter; power about 1000 W; a base pressure of about $5 \times 10^{-8}$ Torr; a process pressure of about 2 mTorr; Argon (Ar) flow of about 75 sccm; a bias voltage of about 0 V; and a target to substrate distance of 1.4 inches.

Various properties of the etch stop material can be controlled at least in part by the deposition process. Exemplary properties that can be controlled can include for example, stability (both thermal stability and physical stability for example), optical properties (transparency, optical loss and index of refraction for example), surface properties (such as roughness). Depending on a final purpose of an article, various properties may be more important than others. In an embodiment where the article is to be used in a HAMR head as a near field transducer (NFT) for example, stability and reliability can be important. NFTs or portions thereof can be exposed at the air bearing surface (ABS) of a HAMR head; this can mean that the material can be exposed to temperatures up to 500° C. and a relative humidity up to 100%. A material that will be utilized in those conditions will advantageously be robust and still retain its reliability.

Etching of the core material can generally be accomplished in disclosed methods using a halide based etch process. Exemplary halide based etch processes include both chlorine based etch processes and fluorine based etch processes for example. Exemplary compounds that can be used in fluorine based etching processes can include, for example, $SF_6$, $CF_4$, $CHF_3$, $C_4F_8$, $C_4F_6$, and combinations thereof. In embodiments that utilize fluorine based etching processes, $SF_6$ can be utilized. Exemplary compounds that can be used in chlorine based etching processes can include, for example, $BCl_3$, $Cl_2$ and combinations thereof. In embodiments that utilize chlorine based etching processes, $BCl_3$ can be utilized.

The etching can be done using commonly known techniques. Exemplary techniques can include, for example, inductively coupled plasma (ICP) etching. In embodiments, the halide based etching can be carried out using ICP etching.

Materials, such as etch stop materials, core materials, and cladding materials can also be described by their etch rates in a particular etch process. Etch rates are generally described by depth of material etched/time. Etch rates can be described in nanometers (nm)/minute (min). In embodiments, the etch rates of the etch stop material and the core material can be compared. In order for an etch stop material to function as an etch stop layer in disclosed methods, the etch stop material has to have an etch rate that is higher than that of the material or materials being etched. For example, in order for an etch stop material to function as an etch stop layer, the etch stop material can have an etch rate that is higher than that of the core material, the cladding material, or both. In embodiments, the etch rate of the etch stop material can be at least about five times (5×) higher than the etch rate of the core material, the cladding material, or both; at least about eight times (8×) higher than the etch rate of the core material, the cladding material, or both; or at least about ten times (10×) higher than the etch rate of the core material, the cladding material, or both.

In embodiments, the higher the difference in etch rate, or "the more selective an etch stop layer" is for a particular etching chemistry, the more advantageously it can be used to control dimensions of an article. A more selective etch stop layer can produce articles with a higher precision, thereby having less variability in feature (either pitting or tapered profile) size. Tighter control over feature size can ultimately provide products with more desirable characteristics. For example, in applications where the article being produced is going to be used as an optical component in a HAMR head, tighter control over feature size can produce a smaller optical spot that can then afford higher areal densities in recording media.

Materials that are deposited can be described as having indices of refraction, n. An index of refraction of a material is dependent on the wavelength or wavelength range of interest. In embodiments, an etch stop material utilized herein can be described as having an index of refraction in the infrared wavelength range (infrared light generally has a longer wavelength than visible light and can be more specifically described as radiation having a wavelength from 780 nm to 1 mm; or more specifically near IR (NIR), which has a wavelength from about 400 nm to about 3 micrometers. For purposes of this disclosure, when an index of refraction is referred to, the index of refraction is in the infrared wavelength range.

Etch stop materials, core materials, cladding materials, and other materials that may be deposited in methods or included in articles disclosed herein can all be characterized by their index of refraction. The index of refraction of an etch stop material can be defined as $n_1$; the index of refraction of the core material can be defined as $n_2$; and the index of refraction of the cladding material can be defined as $n_3$.

The relationships of $n_1$, $n_2$, and $n_3$ can depend in part on the relative locations of the three components (if all three are present). In embodiments, $n_1$ is not greater than $n_2$ ($n_1 \leq n_2$). In embodiments, $n_2$ can be about equal to $n_1$ ($n_2 \approx n_1$). In embodiments, $n_2$ can be greater than $n_1$ ($n_2 > n_1$); In embodiments, $n_1$ is not more than about 20% less than $n_2$, or not more than about 15% less than $n_2$, or not more than about 10% less than $n_2$.

In embodiments where $n_1 > n_3$ and $n_2 > n_3$, the etch stop layer can be included or encased in the core layer and the device can generally be utilized as an optical grating. In embodiments where $n_2 > n_1$ and $n_2 > n_3$, the etch stop layer can be outside the core layer and the device can generally e utilized as a near field transducer (NFT). In embodiments, where the device is to be used in the NIR range, the etch stop layer can have an index of refraction that is from about 1.75 to about 2.05. In embodiments, where the device is to be used n the NIR range, the etch stop layer can have an index of refraction of about 1.8 to about 2.0; in embodiments the etch stop layer has an index of refraction of about 1.9.

In embodiments where the article is to be utilized for optical purposes, the index of refraction of the etch stop material ($n_1$) may be at least partially matched to the materials that are around it in the article. Alternatively, the thinner the layer of etch stop material is, the less optical effect it will have, therefore, if a material is less "matched" to its surrounding materials, this can be compensated for by making the etch stop layer thinner. For example, in embodiments where the etch stop layer is within or has core material at least partially above and below it, $n_2$ can be about equal to $n_1$ ($n_2 \approx n_1$). In such an embodiment, an etch stop material whose index of refraction substantially matches the index of refraction of the core material may provide advantageous optical properties when compared with an etch stop material that has a substantially lower index of refraction. In such an embodiment, the index of refraction can be greater than or equal to about 1.85 ($n_1 \geq 1.85$). Such an embodiment can be advantageous when the article is to be used as a grating. In embodiments where the etch stop layer is outside of the core, for example between a core layer and a cladding layer, $n_2$ can be greater than $n_1$ ($n_2 > n_1$). In such an embodiment, an etch stop material whose index of refraction is less than that of the index of refraction of the core material can function in the same fashion as the cladding material. In such an embodiment, the index of refraction can be less than or equal to about 1.95 ($n_1 \leq 1.95$). Such an embodiment can be advantageous when the article is to be used as a near field transducer (NFT).

Exemplary etch stop materials can include one compound or two or more compounds. Exemplary etch stop material can include, for example, yttrium (Y), scandium (Sc), lanthanum (La), and compounds formed therefrom. In embodiments, etch stop materials can include yttrium oxide ($Y_2O_3$), scandium oxide ($ScO_x$), and lanthanum oxide ($LaO_x$), for example. Etch stop materials can also include combinations of compounds, for example, an etch stop material can include $Y_2O_3$ and $TaO_x$; $Y_2O_3$ and $SiO_2$; $Y_2O_3$ and $AlO_x$; $ScO_x$ and $TaO_x$; $ScO_x$ and $SiO_2$; $ScO_x$ and $AlO_x$; $LaO_x$ and $TaO_x$; $LaO_x$ and $SiO_2$; or $LaO_x$ and $AlO_x$. Etch stop materials can also include yttrium (Y), scandium (Sc), or lanthanum (La) compounds doped with an oxide that has advantageous optical properties. Examples of such oxides can include, for example $Ta_2O_5$, $Nb_2O_5$, $TiO_x$, $HfO_x$, $ZrO_x$, $SiO_2$, $Al_2O_3$, MgO, $CeO_x$, $ZnO_x$, and $GeO_x$.

In exemplary embodiments where the halide based etching process is a chlorine based etching process, the etch stop material can include $Y_2O_3$, a combination of $Y_2O_3$ and $TaO_x$, or a combination of $Y_2O_3$ and $SiO_2$. In exemplary embodiments where the halide based etching process utilizes $BCl_3$, the etch stop material can include $Y_2O_3$, a combination of $Y_2O_3$ and $TaO_x$, or a combination of $Y_2O_3$ and $SiO_2$. In exemplary embodiments where the halide based etching process is a fluorine based etching process, the etch stop material can include $Y_2O_3$ or a combination of $Y_2O_3$ and $AlO_x$. In exemplary embodiments where the halide based etching process utilizes $SF_6$, the etch stop material can include $Y_2O_3$ or a combination of $Y_2O_3$ and $AlO_x$.

Figure 5A:
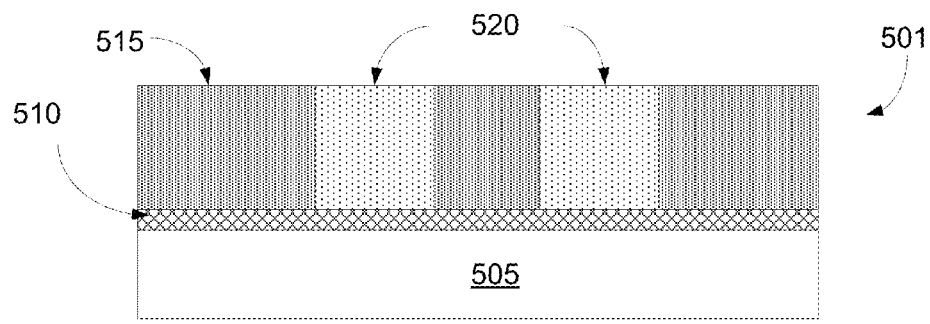
FIGS. 5A-5C show exemplary optical articles disclosed herein.

Also disclosed herein are articles. Generally, exemplary articles disclosed herein can include at least an etch stop layer, and an etched core layer. FIG. 5A illustrates an exemplary article. This article 501 can include a substrate 505. Generally, the substrate may be part of a larger article, may have other features formed thereon, or both. Exemplary materials for the substrate can include, for example, silicon (Si), silicon dioxide ($SiO_2$), aluminum oxide ($Al_2O_3$), germanium (Ge), or alloys thereof. In some embodiments, the substrate 505 can also serve the function of a cladding layer. The exemplary article 501 also includes an etch stop layer 510. In this embodiment, the etch stop layer is illustrated as adjacent, on, or directly on the substrate 505; it will be understood that intervening layers, for example a separate cladding layer (exemplary materials that can be utilized as cladding materials can include, for example, silicon dioxide ($SiO_2$) and alumina ($Al_2O_3$)), could also be disposed between the etch stop layer 510 and the substrate 505. The etch stop layer 510 can be made from materials, such as those discussed above. The etch stop layer 510 can generally have a thickness from about 10 nm to about 100 nm; from about 10 nm to about 30 nm; or about 20 nm. The exemplary article 501 also includes an etched core layer 515. The etched core layer 515 is adjacent to, on, or directly on the etch stop layer 510. The core layer can generally be made from $Ta_2O_5$, $Nb_2O_5$, $TiO_x$, or $Si_3N_4$ for example. The thickness of the etched core layer 515 can depend at least in part on the particular function and structure of the overall article. The exemplary article 501 also includes at least one active region 520. The active regions 520 can be made by filling in the etched regions of the etched core layer 515. The exemplary article 501 can also include additional layers not pictured in FIG. 5A, for example, a bottom cladding layer, a top cladding layer, or both can be included in the article 501. Articles disclosed herein, including those such as article 501 can be utilized as waveguides. Articles formed using methods disclosed herein can have advantages because the etch stop layers allow precise control of the dimensions of the active regions 520.

Figure 5B:
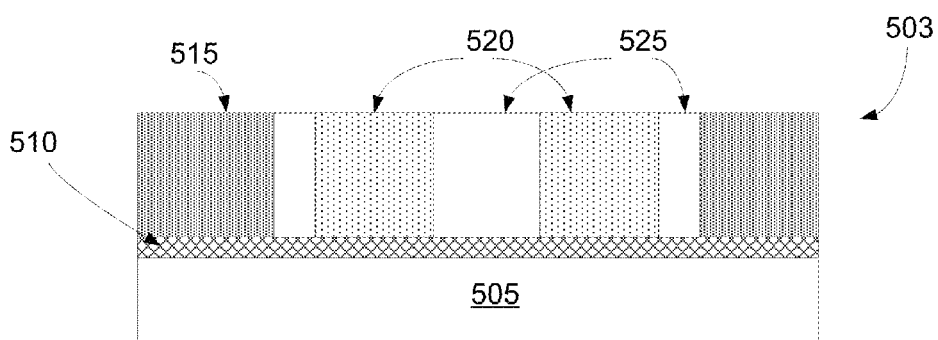

FIG. 5B illustrates another exemplary article 503. The article 503 includes the components, numbered similarly, of FIG. 5A but also includes a cladded area 525 in the etched core layer 515 in which the active regions 520 are located. The exemplary article 503 can also include additional layers not pictured in FIG. 5B, for example, a bottom cladding layer can also be included in the article 501. Articles disclosed herein, including those such as article 503 can be utilized as waveguides.

In embodiments, articles disclosed herein can be utilized as waveguides. Such exemplary waveguides can include a $Ta_2O_5$ core layer, which has an index of refraction of about 2.1, and an etch stop layer made of a material that has an index of refraction of less than about 2.1. Such exemplary waveguides can include a $Ta_2O_5$ core layer, which has an index of refraction of about 2.1, and an etch stop layer made of $Y_2O_3$, which has an index of refraction of about 1.8-1.9. Such exemplary waveguides can include a $Nb_2O_5$ core layer, which has an index of refraction of about 2.2, and an etch stop layer made of a material that has an index of refraction of less than about 2.2. Such exemplary waveguides can include a $Nb_2O_5$ core layer, which has an index of refraction of about 2.2, and an etch stop layer made of $Y_2O_3$, which has an index of refraction of about 1.8-1.9. Such exemplary waveguides can include a $Si^3N_4$ core layer, which has an index of refraction of about 1.93, and an etch stop layer made of a material that has an index of refraction of less than about 1.93. Such exemplary waveguides can include a $Si_3N_4$ core layer, which has an index of refraction of about 1.93, and an etch stop layer made of $Y_2O_3$, which has an index of refraction of about 1.8-1.9. In such embodiments, the etch stop layer can have a thickness of about 10 nm to about 30 nm, or in embodiments about 20 nm.

Figure 5C:
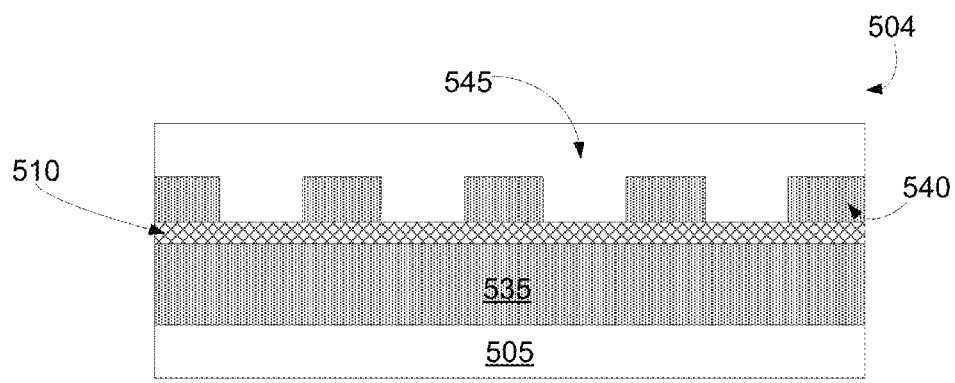

FIG. 5C illustrates another exemplary article 504. The article 504 includes a substrate 505 upon which is an adjacent first core layer 535. Positioned adjacent to, on, or directly on the first core layer 535 is an etch stop layer 510. Positioned on the top of, directly on top of, or above the etch stop layer 535 is an etched second core layer 540. Positioned on top of, directly on top of, or above the etched second core layer 540 is a top cladding layer 545. The exemplary article 504 can also include additional layers not pictured in FIG. 5C, for example, a bottom cladding layer can also be included in the article 504. Articles disclosed herein, including those such as article 501 can be utilized as optical gratings. Articles formed using methods disclosed herein can have advantages because the etch stop layers allow precise control of the dimensions of the etched second core layer 540, which can function as grates in an optical grating.

A specific exemplary method disclosed herein includes the following steps: deposit a bottom cladding material on a substrate to form a bottom cladding layer (in embodiments, the cladding material can be $Al_2O_3$); deposit an etch stop material on the bottom cladding layer to form an etch stop layer (in embodiments, the etch stop material can be $Y_2O_3$ and the etch stop layer can have a thickness of about 10 to about 20 nm); deposit a core material on the etch stop layer to form a core layer (in embodiments the core layer can be Ta2O5 and the core layer can have a thickness of about 150 nm); deposit a amorphous carbon to form an amorphous carbon layer (in embodiments the amorphous carbon layer have a thickness of about 20 nm); etch the article using a halide based etch process, wherein etching etches the amorphous carbon layer and the core layer and stops at the etch stop layer (in embodiments, the halide based etch process can be $SF_6$ etching); back fill the etched area with a front cladding layer (in embodiments the front cladding material can be either $SiO_2$ or $Al_2O_3$); CMP areas for active regions, stopping at the amorphous carbon layer; back fill an active material into the voids (in embodiments, the active material can be gold); CMP the surface stopping on the amorphous carbon layer; and then remove the amorphous carbon layer (in embodiments, the amorphous carbon layer can be removed by ashing).

Figure 6:
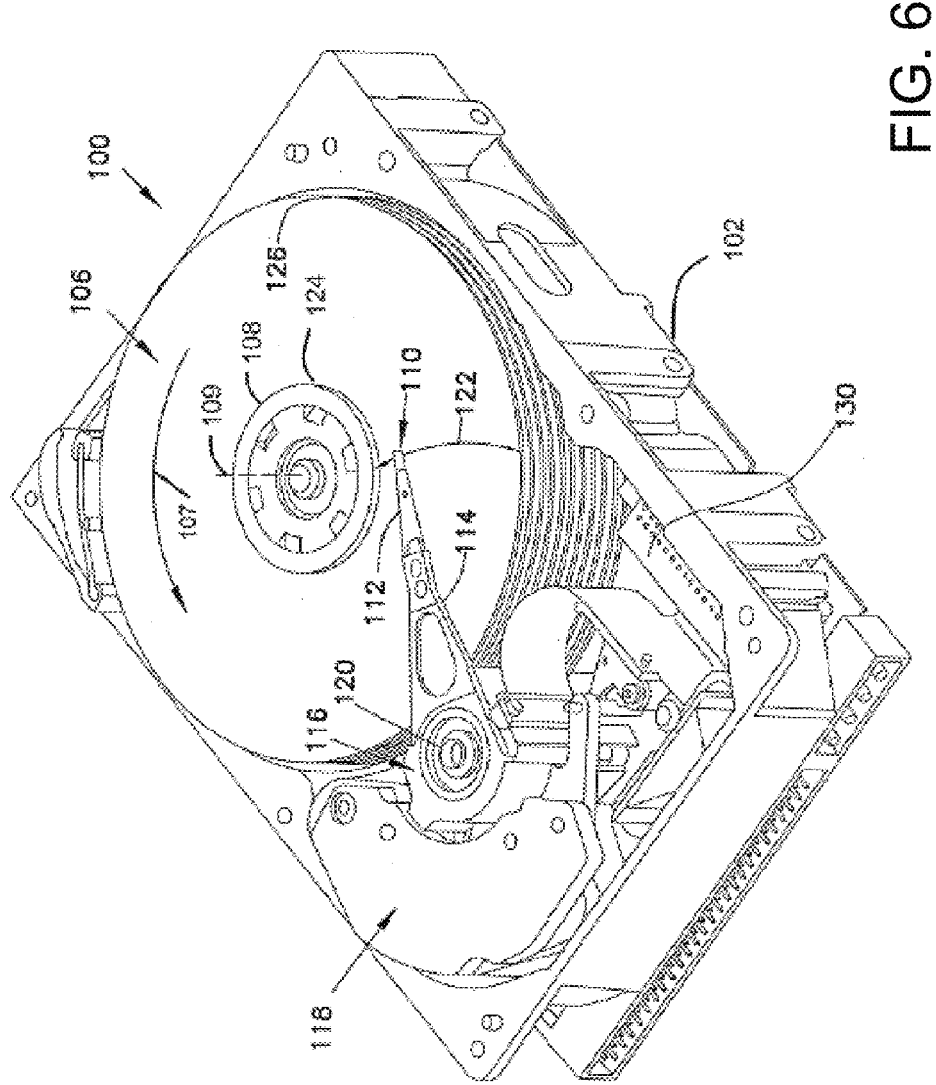
FIG. 6 illustrates a plan view of an example disc drive.

FIG. 6 is an isometric view of a disc drive 100 in which the presently disclosed optical transducers are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about a central axis 109. Each disc surface has an associated disc head slider 110 which is mounted to disc drive 100 for communication with the disc surface. In the example shown in FIG. 6, sliders 110 are supported by suspensions 112 which are in turn attached to track accessing arms 114 of an actuator 116. The actuator shown in FIG. 6 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). Disc drives 100 and heads 110 such as those illustrated in FIG. 6 can include optical articles, such as a near field transducers (NFTs) and/or optical gratings (not shown in FIG. 6), including those disclosed and described herein.

EXAMPLES

While the present disclosure is not so limited, an appreciation of various aspects of the disclosure will be gained through a discussion of the examples provided below.

Example 1

Using magnetron RF sputtering of a $Y_2O_3$ target, with the following parameters [A magnetron design having a rotary apple shape alignment; a magnetron field>500 Gauss; a target having a diameter of about 13 inches in diameter; power about 1000 W; a base pressure of about $5\times10^{-8}$ Torr; a process pressure of about 2 mTorr; Argon (Ar) flow of about 75 sccm; a bias voltage of about 0 V; and a target to substrate distance of 1.4 inches] a film of $Y_2O_3$ was obtained. The film was deposited at a rate of 4 Å/KJ; had a non-uniformity (8" wafer, range/mean) of less than 4%; had optical loss (at 830 nm) of 2 dB/cm; had a refractive index of 1.9 at 830 nm; had a [111] texture; had a coefficient of thermal expansion (up to 300° C.) $5.7\times10^{-6}K^{-1}$; had an as deposited stress of −250 Mpa; had a roughness (up to 500 nm thickness) of less than 1.2 nm; and had a thermal conductivity of about 1.5 $Wm^{-1}K^{-1}$.

Figures 7A, 7B:
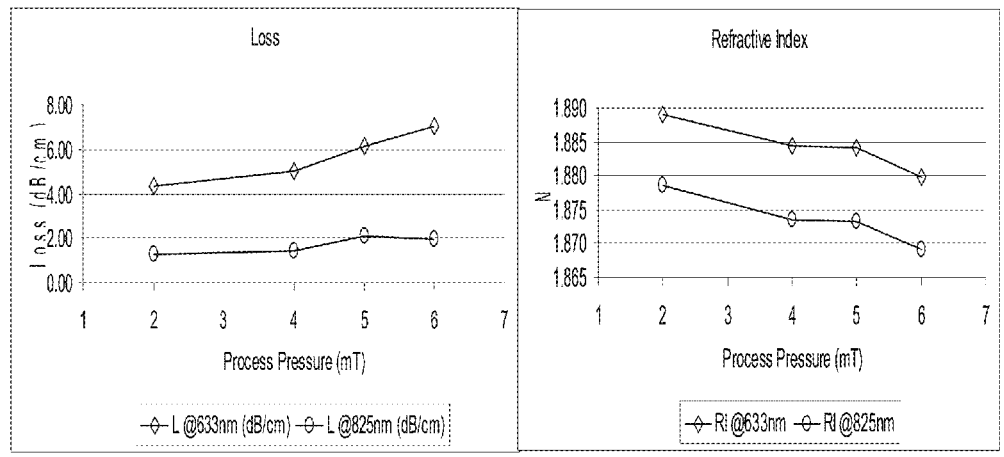
FIGS. 7A-7D are graphs showing various properties of $Y_2O_3$ as a function of deposition parameters.
Figures 7C, 7D:
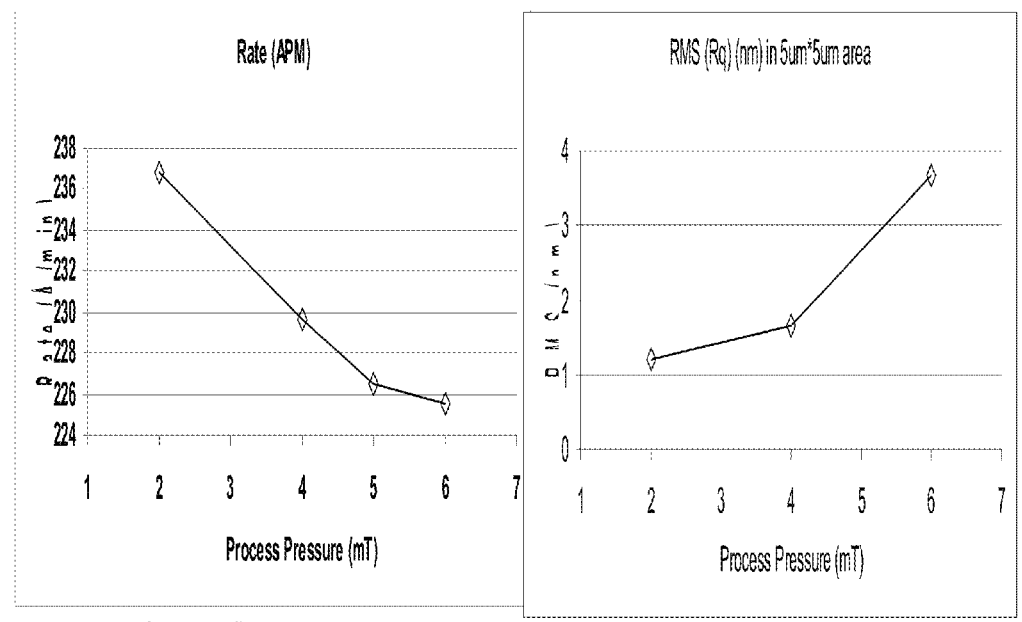

By reducing the pressure, both optical loss (as seen in FIG. 7A) and roughness (FIG. 7B) of the $Y_2O_3$ film are decreased. Decreased optical loss and roughness can be considered advantageous optical properties. As seen in FIGS. 7C and 7D, the decreasing pressure also increases the deposition rate (FIG. 7C) and the refractive index (FIG. 7D).

Example 2

A structure was formed on a substrate (what was the substrate?) having a 20 nm $Y_2O_3$ etch stop layer (deposited as in Example 1 above) deposited on the substrate, followed by a $Al_2O_3$ core layer. A $BCl_3$ ICP etch process was utilized to etch the $Al_2O_3$ core layer. The etching parameters were source power of 1750 W; a bias power of 400 W; gas flow rates of 22 sscm $BCl_3$, 2 sccm $Cl_2$, and 2 sccm Ar; 0.12 Pa; and 80° C. The etch rate of the $Al_2O_3$ under these conditions is 145 nm/min and $Y_2O_3$ is 7.5 nm/min.

Figure 8:
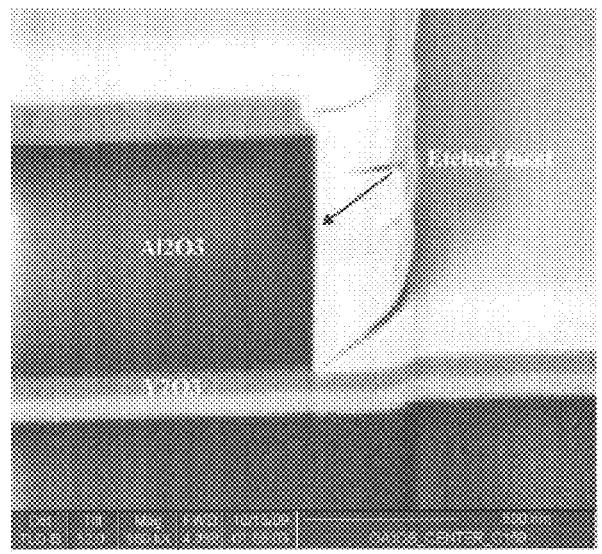
FIG. 8 is a scanning electron microscope (SEM) image of an etched facet of an article.

FIG. 8 shows a SEM image of the etched article showing the etched facet of the $Al_2O_3$.

Example 3

Figure 9:
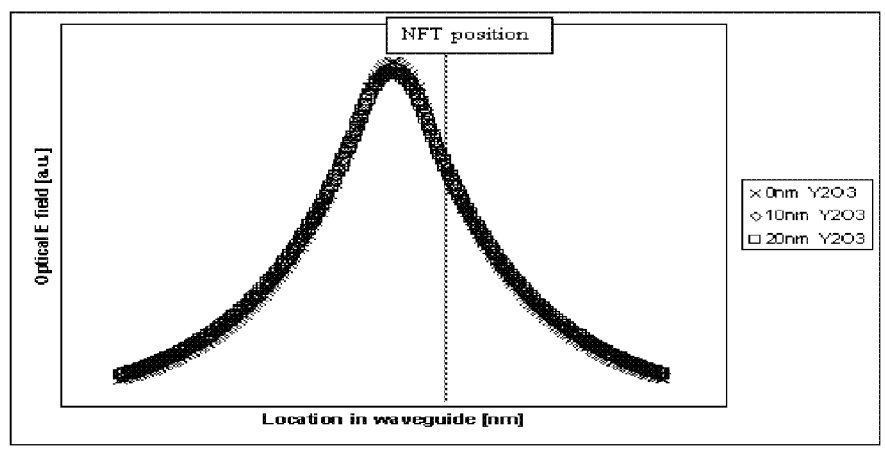
FIG. 9 is a graph showing the change in optical intensity as a function of the thickness of a $Y_2O_3$ etch stop layer.

An optical grating, similar to that of FIG. 5C was manufactured. The etched core layer 540 had a depth of 50 nm; both core layers 535 and 540 were made of $Ta_2O_5$, and the entire depth of the core material (thickness of gray area of FIG. 5C) was 125 nm. The etch stop layer was $Y_2O_3$ and was varied from 0 nm (not present in the structure), 10 nm, and 20 nm. FIG. 9 shows the effect of the thickness of the etch stop layer on the optical field (atomic units) by graphing he optical intensity that reached the NFT.

Thus, embodiments of OPTICAL ARTICLES AND METHODS OF MAKING THE SAME are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method for fabricating an optical device comprising:
   depositing an etch stop material to form an etch stop layer, wherein the etch stop material comprises yttrium oxide ($Y_2O_3$), scandium (Sc) or alloys thereof, or lanthanum (La) or alloys thereof and has a refractive index in the infrared wavelength range, $n_1$;
   depositing a core material to form a core layer, wherein the core material has a refractive index in the infrared wavelength range, $n_2$; and
   etching the core layer using a halide based etch process, wherein the etch stop material has an etch rate in the halide based etch process and the core material has an etch rate in the halide based etch process, wherein the etch rate of the core material is at least about five times higher than the etch rate of the etch stop material, and wherein $n_1$ is not greater than $n_2$.

2. The method according to claim 1, wherein the etch rate of the core material is at least about eight times higher than the etch rate of the etch stop material.

3. The method according to claim 1, wherein the etch rate of the core material is at least about ten times higher than the etch rate of the etch stop material.

4. The method according to claim 1, wherein the halide based etch process utilizes a fluorine containing compound selected from the group consisting of: $SF_6$, $CF_4$, $CHF_3$, $C_4H_8$, and $C_4F_6$.

5. The method according to claim 1, wherein the halide based etch process utilizes a chlorine containing compound selected from the group consisting of: $BCL_3$ and $Cl_2$.

6. The method according to claim 1, wherein the core layer is deposited on the etch stop layer.

7. The method according to claim 6, wherein $n_1$ is less than $n_2$.

8. The method according to claim 1 further comprising depositing a second core layer and wherein the etch stop layer is deposited between the core layer and the second core layer.

9. The method according to claim 8, wherein $n_1$ is not less than 10% less than $n_2$.

10. The method according to claim 1, wherein the etch stop material comprises yttrium oxide ($Y_2O_3$).

11. The method according to claim 10, wherein the etch stop material further comprises $TaO_x$, $SiO_2$, $AlO_x$, $Ta_2O_5$, $Nb_2O_5$, $TiO_x$, $HfO_x$, $ZrO_x$, MgO, $CeO_x$, $ZnO_x$, $GeO_x$, or combinations thereof.

12. The method according to claim 1, wherein the etch stop material comprises scandium (Sc), lanthanum (La), or alloys thereof.

13. A method for fabricating an optical device comprising:
   depositing a cladding layer on a substrate;
   depositing an etch stop material on the cladding layer to form an etch stop layer, wherein the etch stop material comprises yttrium oxide ($Y_2O_3$);
   depositing a core material on the etch stop layer to form a core layer; and
   etching the core layer using a halide based etch process, wherein the etch stop material has an etch rate in the halide based etch process and the core material has an etch rate in the halide based etch process, and wherein the etch rate of the core material is at least about five times higher than the etch rate of the etch stop material.

14. The method according to claim 13, wherein the etch rate of the core material is at least about ten times higher than the etch rate of the etch stop material.

15. The method according to claim 13, wherein the core material comprises tantalum oxide ($Ta_2O_5$).

16. The method according to claim 13, wherein the halide based etch process is selected from a process that includes $SF_6$ or a process that includes $BCl_3$.

17. The method according to claim 13, wherein the halide based etch process is carried out using inductively coupled plasma (ICP) etching.

18. The method according to claim 13, wherein the etch stop layer has a thickness from about 10 nm to about 30 nm.

* * * * *